(12) United States Patent
Andersen

(10) Patent No.: US 6,279,609 B1
(45) Date of Patent: *Aug. 28, 2001

(54) FLOW CONTROL MEANS

(75) Inventor: Kaare Andersen, Nevlunghavn (NO)

(73) Assignee: Per Velve, Tjodalyng (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,374

(22) PCT Filed: Dec. 15, 1997

(86) PCT No.: PCT/NO97/00340

§ 371 Date: Jun. 18, 1999

§ 102(e) Date: Jun. 18, 1999

(87) PCT Pub. No.: WO98/28669

PCT Pub. Date: Jul. 2, 1998

(30) Foreign Application Priority Data

Dec. 20, 1996 (NO) .................... 965496

(51) Int. Cl.⁷ .................... G05D 7/00
(52) U.S. Cl. .................... 137/578; 137/589; 137/590
(58) Field of Search .................... 137/578, 589, 137/590

(56) References Cited

U.S. PATENT DOCUMENTS

| 1,108,090 | 8/1914 | Barieau . | |
|---|---|---|---|
| 1,183,122 | 5/1916 | Rollins . | |
| 1,955,308 | 4/1934 | Naftel et al. . | |
| 2,396,962 | 3/1946 | Moore . | |
| 2,882,928 | * 4/1959 | Cogliati | 137/578 |
| 3,113,698 | * 12/1963 | Abplanalp | 137/578 X |
| 4,052,180 | * 10/1977 | Erickson | 137/578 X |
| 4,094,338 | 6/1978 | Bauer . | |
| 5,133,854 | 7/1992 | Horvath . | |
| 5,290,434 | * 3/1994 | Richard | 210/109 |

FOREIGN PATENT DOCUMENTS

| 395 562 | 12/1965 | (CH) . | |
|---|---|---|---|
| 25 40 088 | * 3/1977 | (DE) | 137/578 |
| 410199 | * 5/1910 | (FR) | 137/578 |
| 440652 | * 2/1975 | (SU) | 137/578 |

* cited by examiner

Primary Examiner—John Rivell
(74) Attorney, Agent, or Firm—Merchant & Gould P.C.

(57) ABSTRACT

A flow control means for stable, constant discharge flow from and to a body of liquid, having a float body (8) which floats on a body of liquid (9), with a main outlet pipe (5) having a mouth/upper end (4) above the upper surface (6) of the body of liquid (9), and into which there is passed, from the body of liquid, one or more feed outlet pipes/gates (2) which open into the main outlet pipe (5) at a desired distance below the upper surface (6) of the body of liquid (9).

6 Claims, 1 Drawing Sheet

FLOW CONTROL MEANS

The present invention is directed towards a float-supported flow control liquid outlet means from and to a body of liquid, and more precisely a liquid outlet fashioned to ensure steady and uninterrupted flow from a body of liquid to subsequent downstream storage or treatment steps.

The invention will be described below with particular reference to outflow from bodies of liquid, and is in fact used specifically for ensuring a steady, uninterrupted outflow from large water-containing containers, vessels or tanks where it is desirable to have a steady outflow uninterrupted by impact loads in the reservoir.

Of known technology in the field, broad reference will be made to the following publications:

1) DE 3 914 702-A1 which describes a device for controlling the outflow from a container containing liquid.

A float is coupled via a suitable mechanism to a mechanical element which in turn, with the aid of a suitable sliding valve, controls the opening of the gates where the fluid flows out;

2) DE 4 436 230-A1 which describes a device for controlling constant liquid flow from a liquid container, and where the opening in the outlet gate is adjusted by means of the liquid level via a spring-loaded plate in the bottom of the container.

When the liquid level in the vessel rises, pressure is exerted on the plate which in turn reduces an outlet opening; and 3) GB 1 131 746 which also describes a device for control of a liquid flow from a a container or reservoir.

In this case, an outlet opening is placed at a certain level in the reservoir so that liquid can flow down and out from the reservoir. An inverted bell or cup is positioned over and around the outlet opening and by adjusting the air pressure in this bell or cup, the liquid level in the area around the outlet opening is in turn adjusted. This permits control of the liquid outflow from the reservoir.

None of these documents describe an outlet device which ensures steady and uninterrupted flow from the body of liquid, in which the outlet means is placed, to the subsequent storage or treatments steps.

A steady and uninterrupted flow is of particular importance where the outflow amount and intake amount are to be set at a certain level, for example, in connection with chemical processes, or where different substances are to be mixed into the liquid for various future purposes.

One of the objects of the present invention is to improve the prior art and accordingly it relates to a flow control means for stable and constant discharge flow from and to a body of liquid. The invention is characterised in that the outlet comprises a float body which floats on a body of liquid, with a main outlet pipe having a mouth/upper end above the upper surface of the body of liquid, and into which there is passed, from the is body of liquid, one or more feed outlet pipes/gates which open into the main outlet pipe at a desired distance below the upper surface of the body of liquid.

The invention will now be described with reference to the accompanying drawings, wherein:

FIG. 1 shows a float body 8, in the illustrated embodiment made of a life buoy-like means, where in the centre of the central opening there is secured a main outlet pipe 5.

Figure 2:
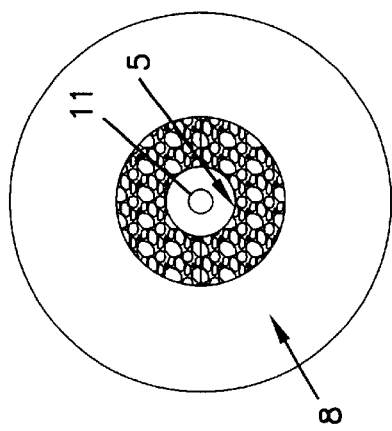
FIG. 2 shows a section through the device in FIG. 1 along a line indicated by the oppositely directed arrows II—II.

The mouth 4 of the pipe 5 is located above the upper surface 6 of the body of liquid 9 and is secured by means of suitable stays 10.

Feed outlet pipe 2 is passed into the main outlet pipe 5 from the body of liquid 9.

These pipes are arranged so that their outlet opening 11 is located below the upper surface 6 of the body of liquid 9 and so that they open centrally into the pipe 5.

Figure 1:
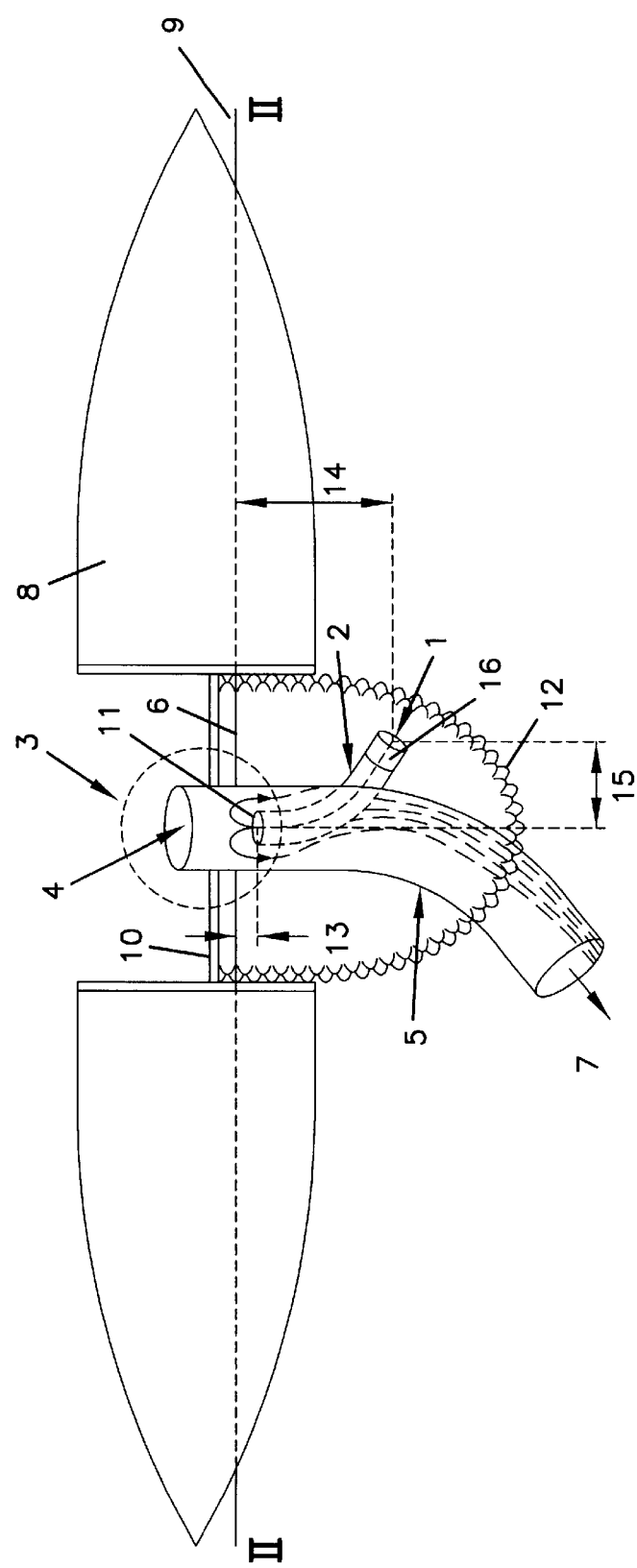
FIG. 1 shows an outflow according to the invention with the float body and main and feed outlet pipes.

Only one pipe 2 is shown in the embodiment illustrated in FIG. 1, but it will be evident that there may be provided a plurality of such pipes at different levels in the main outlet pipe 5, which permits liquids to be collected from different locations in the body of liquid 9 for outflow through the same main outlet pipe 5.

The feed outlet pipes 2 may be equipped with suitable outlet valves 16 for control of the flow.

To ensure steady outflow through the pipe 5 without any suction effect being generated which may disturb the flow, the pipe 5 is open towards the surrounding atmosphere at a good distance above the upper surface 6 of the body of liquid 9. This ensures free influx of air, or if so desired, of another gas, at atmospheric pressure from the mouth area 3, through the mouth 4, and this mouth may also be used for introducing desired substances that are to be mixed with the outflow through the pipe 5.

The feed outlet pipes 2 empty into the main outlet pipe 5 through a feed outlet 11. Only one feed outlet 11 is shown in the embodiment illustrated in FIG. 1, but it will be evident that there may be provided a plurality of feed outlets 11 if a plurality of feed outlet pipes 2 are provided. From the feed outlet 11, liquid flows through the main outlet pipe 5 to the main outlet 7.

In the illustrated embodiment the opening 1 of the feed outlet pipe 2 is disposed within a protective netting 12 to prevent unwanted dust and contaminants from being included in the outflow.

In the case of long pipes 2, when it is desirable to collect samples from more distant locations in the body of liquid 9, it will be clear that identical means can be provided around their inlet openings 1.

The feed outlet pipe 2 is connected to the main outlet pipe 5 in such a way that the feed outlet 11 is a first distance 13 below the upper surface 6 of the body of liquid 9. Furthermore, the feed outlet pipe 2 extends away from the main outlet pipe 5, such that the opening 1 of the feed outlet pipe 2 is positioned a second distance 14 below the upper surface 6 of the body of liquid 9 and a third distance 15 away from the main outlet pipe 5. It will be evident that if a plurality of feed outlet pipes 2 are provided, there may be a plurality of first, second, and third distances 13,14, and 15.

The device according to the invention ensures steady and uninterrupted flow through the outflow, inasmuch as the amount can be set at a desired level by appropriate control of the feed outlet pipes 2, unaffected by natural or other impact loads on the body of liquid 9.

This ensures a far more stable operation of downstream storage or processing steps, whereby a considerably more stable quality may also be ensured.

The guaranteed, stable outflow through the pipe 5 also permits stable, economical proportioning of chemicals or other substances through the mouth 4 of the pipe 5, should this be desirable.

The main outlet pipe 5 is supported by at least one support 10. The support 10 is connected to at least one float body 8 that is adapted to float on the body of liquid 9.

The device of the invention is inexpensive, simple to produce and easy to maintain as it does not contain any moveable parts other than optional control valves for the feed outlet pipes 2, should such valves be desirable.

What is claimed is:

1. A flow control for stable, constant discharge flow from a body of liquid, comprising a main outlet pipe supported by a float body which floats on a body of liquid, wherein the main outlet pipe has a mouth disposed above an upper surface of the body of liquid, and at least one feed outlet pipe that opens into the main outlet pipe below the upper surface of the body of liquid, the at least one feed outlet pipe extending away from the main outlet pipe.

2. The flow control means of claim 1, wherein the at least one feed outlet pipe opens into the main outlet pipe at a first distance below the upper surface of the body of liquid;

the at least one feed outlet pipe opens into body of liquid a second distance below the surface of the body of liquid; and the at least one feed outlet pipe opens into the body of liquid a third distance away from the main outlet pipe.

3. The flow control means of claim 1, wherein an opening of the at least one feed pipe into the body of liquid is covered with a protective netting.

4. The flow control means of claim 1, wherein the at least one feed outlet pipe is equipped with a valve for controlling fluid flow there through.

5. The flow control means of claim 1, wherein the at least one feed outlet pipe opens centrally into the main outlet pipe.

6. A flow control means for stable, constant discharge flow from a body of liquid, comprising a main outlet pipe support by a float body which floats on a body of liquid, wherein the main outlet pipe has a mouth disposed above an upper surface of the body liquid, and at least one feed outlet pipe that opens into the main outlet pipe below the upper surface of the body of liquid, and the at least one feed outlet pipe opens centrally into the main outlet pipe.

* * * * *